Figure 1:
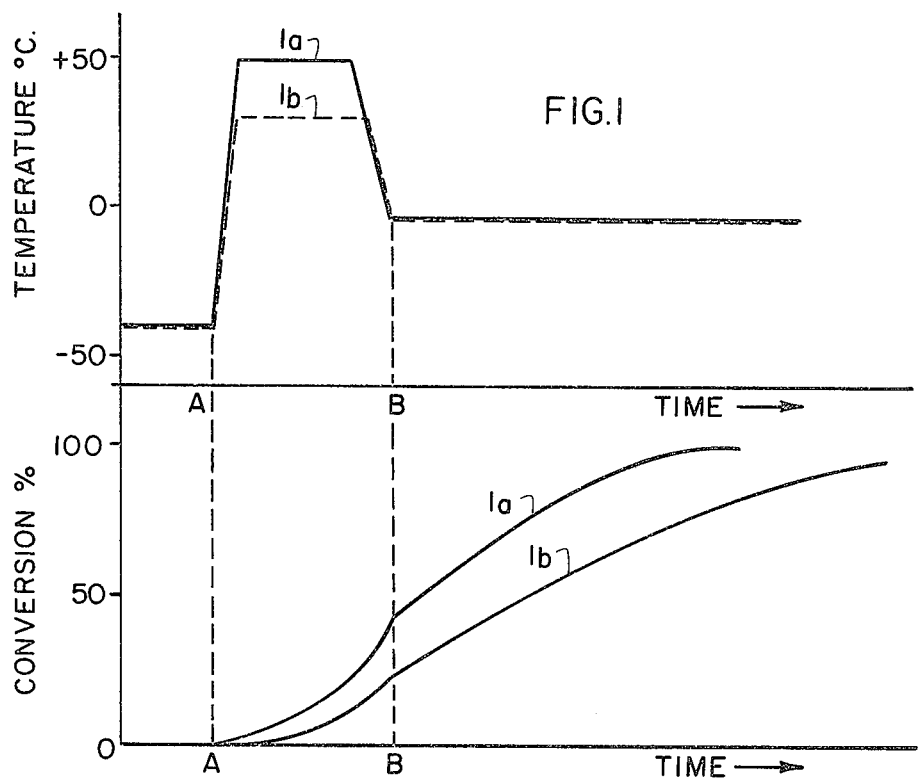

United States Patent

Stoy et al.

[11] 3,897,382
[45] July 29, 1975

[54] METHOD FOR THE ACID HYDROLYSIS OF ACRYLONITRILE CONTAINING POLYMERS, HYDROGELS AND FIBERS OF PRODUCTS PREPARED BY SAID METHOD

[75] Inventors: Vladimir Stoy; Artur Stoy; Renata Urbanova; Jaroslav Prokop; Josef Kucera, all of Prague, Czechoslovakia

[73] Assignee: Ceskoslovenska akademie ved No. 3 Narodni, Prague, Czechoslovakia

[22] Filed: Mar. 20, 1974

[21] Appl. No.: 453,080

Related U.S. Application Data

[63] Continuation of Ser. No. 377,270, July 9, 1973, abandoned.

[30] Foreign Application Priority Data

July 14, 1972 Czechoslovakia ............... 5011-72

[52] U.S. Cl.... 260/29.6 AN; 260/63 N; 260/85.5 ES; 260/85.5 XA; 260/85.5 HC; 260/88.7 B
[51] Int. Cl. ............................................ C08f 45/24
[58] Field of Search ...... 260/85.5 ES, 63 N, 85.5 S, 260/88.7 B, 29.6 AN, 85.5 XA, 85.5 HC

[56] References Cited

UNITED STATES PATENTS

| 2,548,853 | 4/1951 | Baker | 8/4 |
| 2,720,440 | 10/1955 | Wallace | 8/111 |
| 2,873,164 | 2/1959 | Hindle | 8/108 |
| 3,104,154 | 9/1963 | Morimoto et al. | 18/54 |
| 3,253,880 | 5/1966 | Lawson, Jr. et al. | 8/115.5 |
| 3,410,837 | 11/1968 | Shibukawa | 260/88.7 |
| 3,414,552 | 12/1968 | Scanley | 260/89.7 |

*Primary Examiner*—Lester L. Lee
*Attorney, Agent, or Firm*—Murray Schaffer

[57] ABSTRACT

There is disclosed a method for the acid hydrolysis of acrylonitrile-containing polymers comprising hydrolyzing said polymers in the presence of about 40 to about 80% concentrated nitric acid at a temperature of about 25 to about 60°C, cooling said acid reaction mixture to about −20° to about +30°C for a period of time sufficient to reach the desired degree of hydrolysis and products produced therefrom.

19 Claims, 4 Drawing Figures

METHOD FOR THE ACID HYDROLYSIS OF ACRYLONITRILE CONTAINING POLYMERS, HYDROGELS AND FIBERS OF PRODUCTS PREPARED BY SAID METHOD

This application is a continuation in part of copending application Ser. No. 377,270, filed on July 9, 1973 and now abandoned.

This invention relates to a new method for the preparation of block (sequential) copolymers of acrylonitrile by the partial homogeneous acidic hydrolysis of acrylonitrile containing homopolymers or copolymers in nitric acid solution.

Heretofore, the acidic hydrolysis of polyacrylonitrile and its copolymers in nitric acid solutions has been carried out in various ways. It has been found that the hydrolysis of polyacrylonitrile and its copolymers proceeds by the so-called "zipper mechanism" and several methods have already been proposed based upon this mechanism of how to speed up and control the mechanism of hydrolysis and the rate thereof. Thus in one of these methods, a copolymer of acrylonitrile with acrylamide or methacrylamide is subjected to hydrolysis instead of polyacrylonitrile alone and the reaction time is believed shortened in this way due to the elimination of the initial stage consisting of the slow formation of amides from the nitriles which nitrile groups are not adjacent the amide groups. Another known method, in addition to accelerating the reaction enables one to set in advance the required conversion and to obtain thereby, products more stable toward further hydrolysis. The latter method essentially consists in the hydrolysis of a terpolymer containing in addition to acrylonitrile and acrylamide or methacrylamide units, a further comonomer which is able to arrest propagation of the hydrolysis along the chain by the zipper mechanism. The units of this termonomer divide the chain into segments and the zipper hydrolysis can freely propagate inside these segments, a part of which contain amide units from the initial stages, while another part thereof does not contain amide units and is thus hydrolyzed far more slowly than the units present from the initial stage.

A method is also known whereby acrylonitrile is polymerized or copolymerized directly in nitric acid and therein there is also carried out the subsequent partial hydrolysis of the polymer.

Another method which permits control of the procedure, consists of dispersing the polymer or copolymer in nitric acid which has been cooled to −50° to −15°C, subsequently elevating the temperature of the resultant dispersion to −5° to +40°C and maintaining the mixture at this temperature for a time necessary to reach the required degree of hydrolysis. The time necessary for dissolution of the polymer is considerably reduced in this procedure and a more homogeneous product with improved properties can be thusly obtained. In addition thereto a solution of high viscosity and concentration of polymer can be obtained and hydrogel articles may be produced therefrom by casting in molds.

It is an object of the instant invention to avoid one or more of the drawbacks of the prior art.

It is another object of the invention to provide a new method for producing acrylonitrile-containing polymers by the homogeneous acidic hydrolysis thereof.

Other objects and advantages of the invention will become more apparent from the following description and claims.

It has now been found that in accordance with a preferred embodiment, the hydrolysis can be controlled by means of a specific temperature regime in such a way that the solution or lyogel of acrylonitrile polymer or copolymer (which does not, however, contain any acrylamide or methacrylamide at the beginning of the reaction) in 50–70% nitric acid is heated to a temperature of about 25° to about 60°C for about 10 minutes to about 24 hours, the solution is then cooled to a temperature ranging from about −10° to about +20°C and maintained at this temperature for the time necessary to achieve the required degree of hydrolysis, and then the reaction is stopped by removing the nitric acid therefrom.

The method therefore, generally speaking, broadly includes the provision of a method for the acid hydrolysis of acrylonitrile-containing polymers comprising hydrolyzing said polymers in the presence of about 40 to about 80% concentrated nitric acid at a temperature of about 25° to about 60°C, cooling said acid reaction mixture to about −20° to about +30°C for a period of time sufficient to reach the desired degree of hydrolysis and products produced therefrom.

While not wishing to be bound by any particular chemical theory, it is believed that the method according to the invention is based upon the fact that the activation energy is higher in the reaction leading to the hydrolysis of the nitrile group which is not adjacent to the amide, that it is in the hydrolysis of the nitrile group adjacent to the amide, i.e. than in the zipper mechanism of hydrolysis. The rate of hydrolysis of the first type of nitriles (primary hydrolysis) is comparable at higher temperatures to the rate of zipper hydrolysis, while the zipper hydrolysis, resulting in the sequential structure of the copolymer, is preferred at lower temperatures. If, on the other hand, the whole hydrolysis was carried out at a temperature above about +25°C, a copolymer with short sequences and inferior mechanical properties would result. At a temperature below about 20°C, the sequences are longer and the hydrolysis requires a longer time.

The invention is believed to consist in part in the creation of sufficient numbers of amides in the chain in the first or initial stage at the elevated temperature, which amides then act as nuclei for further propagation of sequences in the second stage where the primary hydrolysis is suppressed by decreasing the temperature. From this view, the procedure resembles the prior art method starting with the copolymer of acrylonitrile-acrylamide, but possess distinct advantages, e.g. that a dissolution of acrylamide-free polyacrylonitrile, substantially no hydrolysis occurs at low temperatures so that the product is more homogeneous. Another advantage is that it is not necessary to take into account the copolymerization abilities of all of the monomeric reactants if the hydrolysis starts with the terpolymer containing a monomer blocking the propagation of the zipper hydrolysis; also the choice of suitable comonomers is thus extended. The amide groups are randomly formed in the primary hydrolysis reaction, i.e. with equal probability at all nitriles which are adjacent to nitrile side groups only. This facilitates control of the hydrolysis and calculation of the product structure is made relatively easy. The starting solutions of acrylonitrile polymer, co- or terpolymer in nitric acid can be prepared in various ways known in the art. For example it is possible to prepare them by precipitation or emulsion polymerization and to later dissolve the polymer in nitric acid, e.g. in such a way that a powdered polymer or copolymer is dispersed in supercooled nitric acid and then the temperature is slowly elevated to the required level (Czechoslovak Pat. No. PV 5010-72 corresponding to U.S. Ser. No. 377,204, filed July 9, 1973. ) or by dispersion of the polymer first in a smaller amount of dilute nitric acid which only dissolves the polymer slowly, and thereafter by the subsequent addition of higher concentrated nitric acid in an amount providing the total concentration which is sufficient for dissolving the polymer (U.S. Pat. No. 2,328,715). Another possibility involves the preparation of the solution by direct polymerization of acrylonitrile or mixture thereof with other comonomers (other than acrylamide and methacrylamide) in nitric acid. This polymerization proceeds very slowly as a rule, so that the chains formed first are subjected to hydrolysis for longer periods of time than those formed in later stages of the polymerization. In spite of this, the hydrolysis and polymerization can be separated from one another in the polymerization of acrylonitrile alone due to the zipper mechanism. To the contrary, however, in the copolymerization of acrylonitrile with acrylamide, the copolymer is hydrolyzed more rapidly so that the hydrolysis cannot be separated from the polymerization and under certain circumstances non-homogeneous products are formed having inferior properties.

In the procedure according to the invention, acrylonitrile is polymerized in nitric acid in the absence of acrylamide and the hydrolysis by the zipper mechanism may first be started after completion of the polymerization by the temporary increase of the temperature so that the product is more homogeneous with respect to the degree of hydrolysis of the single chains. The elevated temperature also speeds up the polymerization in its last stage where it is slowest due to the already low concentration of monomers and initiator present therein. In some cases, it may be convenient to carry out the polymerization at the higher temperature as soon as a 50% conversion is reached and to lower the temperature only after a high conversion of the polymerization (about above 90%) is achieved.

The invention can be used not only for polyacrylonitrile solutions, but also for lyogels, both the physical ones having the gel character due to high molecular weight and to real gels having the polymer interlinked by chemical bonds. Such real gels of acrylonitrile polymers or copolymers swollen by nitric acid can be prepared by the polymerization of acrylonitrile in nitric acid in the absence of chain transfer agents and at high concentration of monomers. The crosslinking (or inter linking) arises probably through chain transfer via the monomer or polymer.

It is to be understood that the instant invention contemplates either employing acrylonitrile alone (i.e. polyacrylonitrile) or a copolymer thereof with a lower ($C_{1-8}$) alkyl acrylate or methacrylate or other suitable monomer such as arylalkenes of the formula

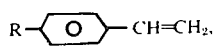

wherein R is $C_{1-8}$ alkyl, i.e. styrene, alkyl or aryl vinyl ketones wherein the aryl group is phenyl and the alkyl group is $C_{1-6}$, i.e. methyl vinyl ketone; vinylidene compounds, i.e. vinylidene chloride; glycol acrylates and methacrylates and the like. What is important is that the comonomer or comonomers not contain a reactive amide group therein. Almost all suitable vinyl reactive comonomers can be employed. The ratio of acrylonitrile to other monomer or monomers were employed can vary from about 80:20 to 99:1 preferably 90:10 to 95:5 for the copolymer; 80:10:10 to 98:1:1 and preferably 90:5:5 to 95:2.5:2.5 to for the terpolymer may be employed. These ranges are, however, substantially non-critical and virtually any suitably comprised acrylonitrile containing polymer is operative.

The method of preparing the polymer forms no essential part of the instant invention. The latter may be made by any suitable method known in the art. It is only where the polymer is prepared by solution polymerization in $HNO_3$ a solvent that the polymerization medium or scheme is relevant, therein, the resultant polymer may be subjected to the hydrolysis in situ, i.e., in the polymerization solvent which solvent acts as the hydrolysis agent.

The relative ratio of $HNO_3$ to polymer is substantially non-critical and can vary from 50:50 to 95:5%, preferably 65:35 to 90:10 by weight.

The concentration of the $HNO_3$ can vary from about 40 to about 80%, although it is preferably about 50 to about 70%. The temperature at which the first stage of hydrolysis is carried out can vary from about 15° to about 75°C, preferably it is about 25° to about 60°C as discussed hereinafter. The time can vary over a wide range (i.e., 10 minutes to 24 hours) and is determined by temperature, concentration, reactant composition and the like. The subsequent temperature change effected during the hydrolysis can vary from about −20° to about +30°C, although about −10° to about +20°C is preferred. The hydrolysis can be arrested if desired by merely removing the $HNO_3$ from the reaction zone.

The products of the instant invention find utility as fibers, hydrogels and the like.

The following figures schematically show the temperature and conversion courses and the dependence thereof on time and further illustrate the fundamental idea of the invention and various modifications thereof.

FIG. 1 indicates the situation where polyacrylonitrile which has been prepared by precipitation polymerization in water, dried and triturated to a fine powder, is then dispersed by stirring into supercooled nitric acid and the temperature is then increased during stirring while the suspension turns into a solution. Curves 1a and 1b in the upper half of FIG. 1 show the temperature courses, curves 1a and 1b the corresponding time plots of the hydrolysis conversion in %. At the temperature increase, beginning at point A on the time axis, on the one hand, polyacrylonitrile starts to dissolve, on the other, the hydrolysis starts to proceed with as continuously increasing rate. The acceleration of hydrolysis in this region is caused both by increasing the temperature and by an autoaccelerated course of the reaction due to the "zipper" mechanism of hydrolysis. On reaching a definite temperature, the mixture starts to cool again as far as point B, the temperature in the region −10° to +20°C is then achieved and is further maintained. The autocatalytic character of the reaction changes at point B. The conversion proceeds at first more or less linearly with time and corresponds to the propagation of amide sequences by the "zipper" mechanism. The reaction rate decreases with rising conversion as the sequences are combined and reach the ends of chains and the number of nitrile groups activated by the adjacent amides decreases; the conversion limits to 100%. In the case where the temperature is increased in point A to a lower value (1b), the autocatalytic character is less expressive and the reaction proceeds behind point B at a lower rate. Similarly, the reaction would proceed at a lower rate behind point B if the interval A-B is shorter or if the resulting temperature in point B is lower.

Figure 2:
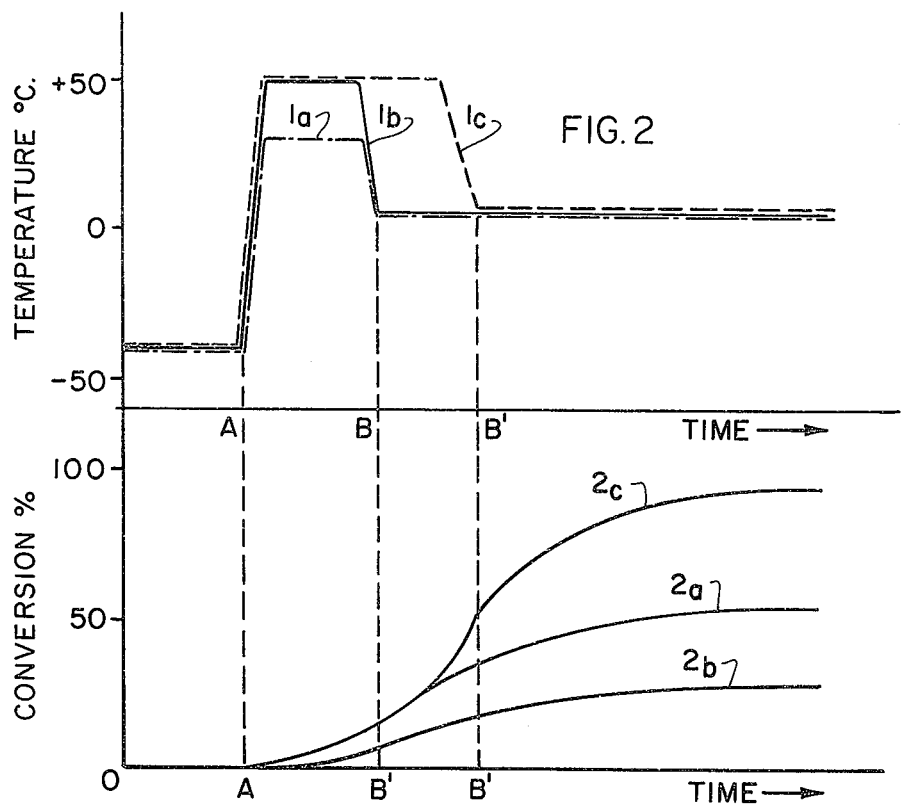

As mentioned above, the procedure according to the invention can also start with a copolymer of acrylonitrile and another monomer the side group of which does not increase the reactivity of the adjacent nitrile group. This case is schematically shown in FIG. 2, where in the upper part there is illustrated again the temperature course shown by the curves 1a, 1b and 1c and in the lower part the time plots of the conversion 2a, 2b and 2c corresponding to these temperature courses. Here, similarly as in the preceding case, the copolymer is prepared in advance by precipitation copolymerization in water, it is then dispersed in supercooled nitric acid, and the temperature is elevated at point A to 25° to 60°C and after a definite time lowered to −10° to +20°C at point B and B', respectively. The polymer starts to transfer into solution at point A and the primary and "zipper" hydrolysis start to proceed thereat. Because the primary hydrolysis proceeds randomly, the individual nitrile sequences which are bordered by the second comonomer or by the comonomer and the chain end, are gradually activated by formation of the first amide in the primary hydrolysis. After the temperature decreases to a value corresponding to point B or B', the hydrolysis proceeds substantially only by the "zipper" mechanism and only in those nitrile sequences which are hit by the primary hydrolysis. The fraction of sequences activated in this way is longer; the higher the temperature achieved at point A the longer is the interval A-B and the less comonomer incorporated in the chain. The lower part of FIG. 2 shows that after cooling the solution at point B or B', the decrease in rate of hydrolysis takes place and the hydrolysis conversion achieves the higher value, the higher the temperature is at the interval A-B or the longer this interval is. The autocatalytic character is somewhat restricted because the comonomer retards full development of the "zipper" hydrolysis. The higher the comonomer content, the sooner after decreasing the temperature at point B the final value of conversion is achieved.

Figure 3:
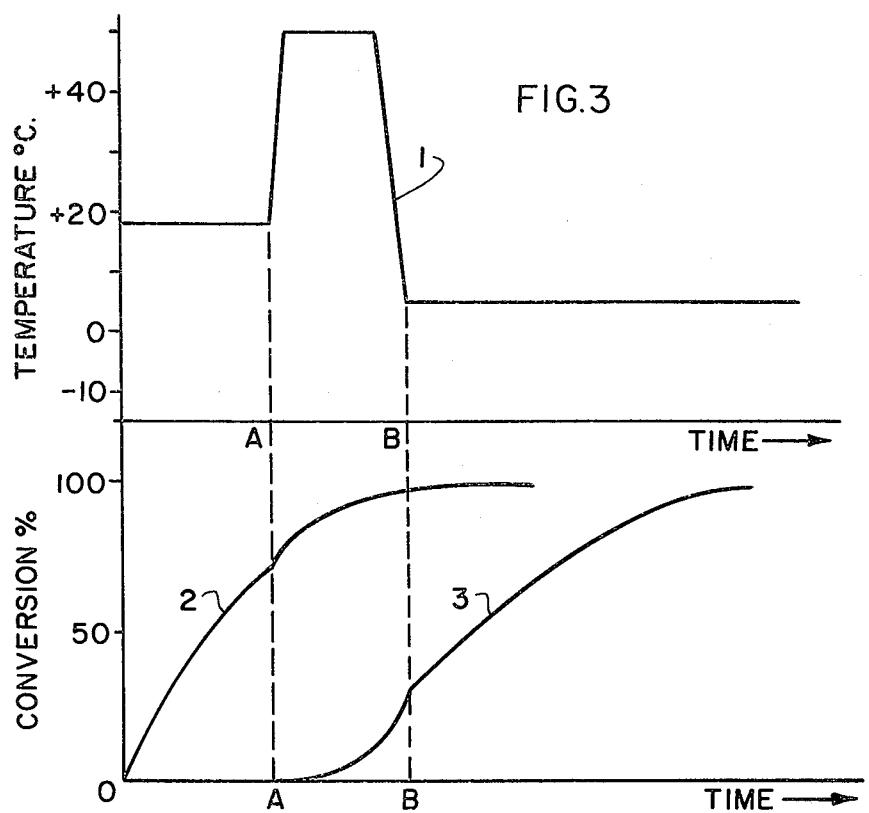

FIG. 3 shows the course wherein the polymer solution is prepared by polymerization of acrylonitrile in nitric acid and the polymer subjected to the further hydrolysis without isolation. The curve 1 in the upper half of the Figure shows the temperature course, in the lower part of the Figure the curve 2 shows the dependence of the polymerization conversion and curve 3 the dependence of the hydrolysis conversion upon time.

Figure 4:
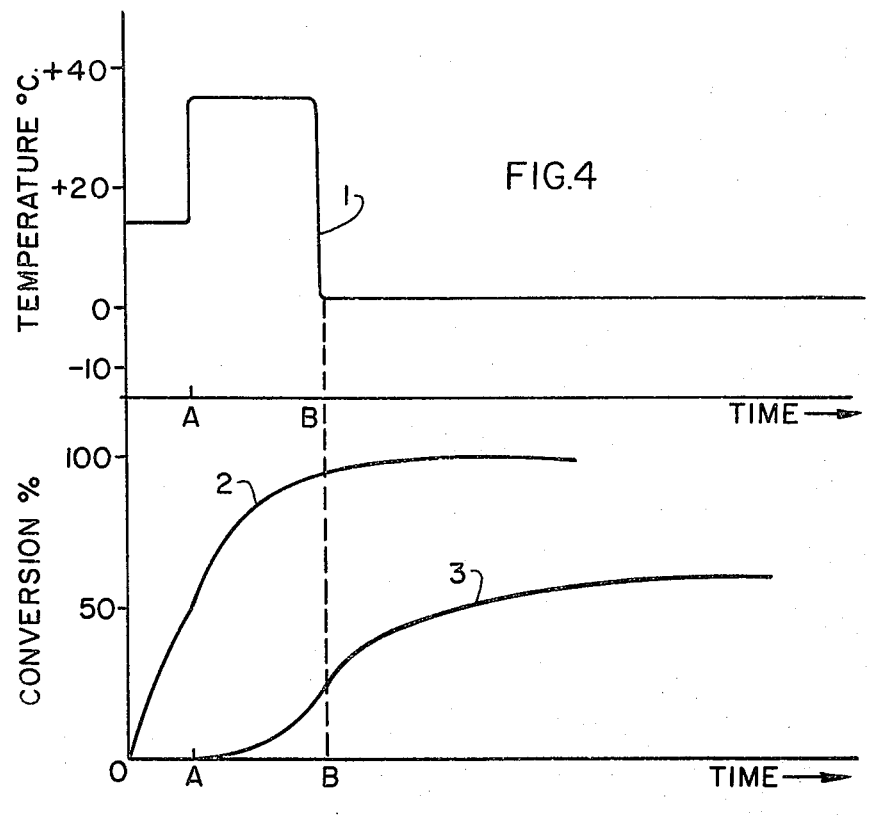

In the case where the copolymer of acrylonitrile with the monomer is able to block propagation of the hydrolysis by the "zipper" mechanism, it is prepared by a solution polymerization in nitric acid and the polymerization is carried out at elevated temperature, (about 50% conversion - FIG. 4). Curve 1 in the upper part of FIG. 4 again shows the course of temperature, curves 2 and 3 in the lower half show the polymerization conversion and the hydrolysis conversion - time dependencies, respectively. Similarly as in the case shown in FIG. 2, the resulting conversion of the hydrolysis is limited and depends on the starting temperature, length of the interval A-B and the comonomer content. The illustration of the invention by the foregoing schematic diagrams is supplemented by the following Examples, wherein, as in the appended claims, all parts, proportions and ratios are by weight unless otherwise indicated.

The following Examples are to be understood as only further illustrative of the invention and not as limiting the scope of the invention.

EXAMPLE 1

Polyacrylonitrile (10 weight parts), which has an average molecular weight of 530,000 and is prepared by precipitation polymerization in water, is added to 40 wt. parts of vigorously stirred 70% nitric acid and cooled to −42°C over 20 minutes. A suspension of pasty consistency is formed, the temperature is then raised to 45°C over 1 hour and the mixture is stirred at this temperature for a further 15 minutes. The suspension turns into a clear solution which is then quickly cooled to −6°C in stillness for 178 hours and is then coagulated into a fiber by passing it through a spinning nozzle of 1 mm in diameter over a 15 cm air gap into an excess of water at 5°C. The fiber is then washed with a dilute solution of sodium hydrogen carbonate and cold-stretched in a wet state to 300%. The thusly produced fiber swells in water moderately and has good mechanical properties. The degreee of hydrolysis conversion determined from the elemental analysis is 14.2% (calculated as a decrease of nitrile groups). A control sample of the same polyacrylonitrile which is hydrolyzed for the same time but at −6°C, coagulates under the same process conditions into a white porous fiber which breaks readily and is unable to be stretched. The degree of hydrolysis conversion thereof is less than 1%.

EXAMPLE 2

Acrylonitrile (9.5 wt. parts) and 0.5 wt. part of n-butyl acrylate are dissolved at 25°C in 190 wt. parts of boiled distilled water and polymerized under nitrogen by means of a redox initiator consisting of ammonium peroxosulfate and potassium disulfite. The precipitated copolymer is then isolated, washed, dried and finely ground. The copolymer (10 wt. parts) has an average molecular weight about 120,000 is finely dispersed at 20°C by stirring into 45 wt. parts of 50% nitric acid. The temperature is then elevated to 30°C for 20 hours and is subsequently decreased to 15°C. The polymer is left at the last mentioned temperature without agitation for an additional 24 hours and is then precipitated into water. The hydrolysis conversion determined from the elemental analysis is 20.5%. When an identical copolymer is kept for 44 hours after dissolving at 15°C and then worked in the same manner, the conversion is merely 8.7%.

EXAMPLE 3

Acrylonitrile (35 wt. parts), 65 wt. parts of 65% white nitric acid and 0.1 wt. part of ammonium peroxosulfate is poured into a mold formed by two glass plates spaced at a distance of 2.5 mm and sealed by a polyethylene packing. The mold with the polymerization mixture is immersed for 14 hours into 15°C warm water, the bath temperature is then increased to +40°C for 6 hours, and finally the mold is transferred into another water bath +5°C were it is left for 100 hours. The mold is then opened, the polymer washed in 1% aqueous solution of sodium hydrogen carbonate and in water. A clear crosslinked hydrogel foil results from this procedure, which hydrogel swells in equilibrium with water on 110% (i.e. it contains after equilibrium swelling 52.5% of water).

EXAMPLE 4

Acrylonitrile (79 wt. parts), 1 wt. part of styrene and 0.2 wt. part of urea are dissolved in 500 wt. parts of 67% white nitric acid, the solution is quickly degased by vacuum water pump, and then an initiator (0.7 wt. part of 10% solution of ammonium peroxosulfate) is added under nitrogen. The polymerization mixture is left for 78 hours at 19°C and then it is heated to 45°C for 1 hour and cooled again to 10°C. At this temperature it is left to stand for a further 204 hours. The solution is then spun in water at the laboratory temperature into a cold-stretchable clear fiber. The degree of hydrolysis determined from the elemental analysis of the copolymer is 53%.

We claim:

1. A method for the acid hydrolysis of acrylonitrile-containing polymers comprising hydrolyzing said polymers in the presence of about 40 to about 80% concentrated nitric acid at a temperature of about 25 to about 60°C, and cooling said acid reaction mixture to about −20° to about +30°C for a period of time sufficient to reach the desired degree of hydrolysis.

2. A method as defined in claim 1 wherein the concentration of said acid is about 50 to about 70%.

3. A method as defined in claim 1 wherein said cooling is carried out at about −10° to about +20°C.

4. A method as defined in claim 1 wherein said acid is first heated for about 10 minutes to about 24 hours.

5. A method as defined in claim 1 wherein said hydrolysis is terminated by separating said polymer from said acid.

6. A method as defined in claim 1 wherein said polymer is prepared by precipitation or emulsion polymerization and thereafter dissolved in said nitric acid for carrying out said hydrolysis.

7. A method as defined in claim 1 wherein said polymer is prepared by solution polymerization in said nitric acid as solvent and subsequently subjected to said hydrolysis therein.

8. A method for the acid hydrolysis of acrylonitrile-containing polymers polymerized at a temperature of less than about 25°C and having at least about 50% conversion comprising carrying out the process as defined in claim 1.

9. A method as defined in claim 1 wherein said polymer is comprised of acrylonitrile and at least one other ethylenically unsaturated non-amide containing monomer.

10. A method as defined in claim 9 wherein said other monomer is selected from the group consisting of $C_{1-8}$ alkyl acrylates or methacrylates, arylalkenes of the formula

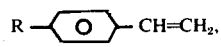

wherein R is $C_{1-8}$ alkyl, alkyl or aryl vinyl ketones, vinyl chloride, glycol acrylates and methacrylates, and vinylidene chloride.

11. A method as defined in claim 9 wherein the ratio of acrylonitrile to said other monomer may vary from about 80:20 to 99:1.

12. A method as defined in claim 1 wherein said polymer is polyacrylonitrile.

13. A method as defined in claim 1 wherein said polymer is a copolymer of acrylonitrile and a $C_{1-8}$ alkyl acrylate.

14. A method as defined in claim 9 wherein said other monomer is a non-amide containing monomer.

15. A hydrolyzed acrylonitrile-containing polymer produced by the method as defined in claim 1.

16. A hydrolyzed acrylonitrile-containing polymer produced by the method as defined in claim 8.

17. An acrylonitrile-containing fiber comprising the hydrolyzed polymer prepared by the method as defined in claim 1 wet spun in an aqueous coagulating bath.

18. A cross linked hydrogel produced from the acrylonitrile-containing polymer prepared by the process as defined in claim 19.

19. The method of preparing cross-linked hydrogel comprising preparing the polymer according to claim 7 wherein no chain-transfer agents are added before of during the polymerization and the polyacrylonitrile lyogel thus formed is subsequently subjected to said hydrolysis, said hydrolysis being terminated by removing the said nitric acid from the gel after a desired degree of hydrolysis is achieved.

* * * * *